Dec. 14, 1965      E. L. VERNON      3,223,272

CAN FOR FLUX

Filed Oct. 1, 1963

INVENTOR.
EVERETT L. VERNON
BY Robert E. Breidenthal
ATTORNEY 3,223,272
CAN FOR FLUX
Everett L. Vernon, Gypsum, Kans.
Filed Oct. 1, 1963, Ser. No. 312,982
4 Claims. (Cl. 220—1)

The present invention relates to new and useful improvements in containers, and in particular pertains to the external surface of a container wall surrounding an access opening having such a configuration as to coact with and serve to cammingly guide an end of an elongated object pressed against the wall into the access opening.

In the art of brazing metals it is necessary to employ a brazing flux. Such brazing flux is available in a variety of forms such as a comminuted solid, powder or granular form, paste, etc. In any event it is necessary that the flux be applied to the position of brazing. This can be accomplished with varying degrees of success by the provision of a flux applicator, incorporation of flux in a composite brazing rod, etc.; however, many skilled in the art prefer to apply flux in a manner such that a portion of flux is adhered to the tip of the brazing rod (from a supply of the flux) with fresh portions of flux being adhered to the rod as they and the rod are consumed. The present invention is primarily concerned with the provision of a container for flux of such character to greatly facilitate the procedural step that must be so frequently repeated of adhering a portion of flux to the tip of the brazing rod.

Brazing flux is presently marketed as a particulate or comminuted solid in a cylindrical container having a removable circular lid or cover that is reusable. Except for the provision of a small central opening in the lid which is in turn provided with a frictionally retained closure plug or cap, the container and the cover thereof are essentially identical in all respects to conventional metallic containers in which paint is ordinarily supplied in quantities of one gallon and less. The flux is commercially available in a container or can size corresponding to about one pint liquid measure, the flux having a net weight of one pound. The cover as is conventional is essentially flat and is releasably and sealingly secured to the upper open end of the container by having a depending annular tongue adjacent the periphery thereof that is received in an annular groove or channel formed about the opening at the top of the container.

In the use of the flux as supplied in the above-described conventional container, the cover is left on the container (so as to preserve the flux and to avoid loss of substantially the entire contents of the container should the latter be inadvertently knocked over) and only the plug or cap removed from the small access opening.

The tip of the brazing rod is heated and thrust into the flux through the access opening, whereupon a portion of flux adheres to the heated tip of the rod, and can be withdrawn with the rod from the container for application along with the rod to the material being brazed. During continuance of the brazing operation, fresh portions of the flux are adhered to the tip of the brazing rod which is of course at a sufficiently elevated temperature. To the extent deemed necessary by the user, the edges of the cover about the access opening afford a convenient means by which excess flux adhering to the rod can be wiped therefrom while withdrawing the rod from the container.

Except as hereinafter brought out, the above-outlined procedure and container are deemed very advantageous, convenient and lead to excellent brazing results.

The principal difficulty encountered in carrying out the procedure outlined above stems from the fact that brazing requires for eye protection the wearing of darkened or substantially opaque glasses because of the brilliance of light associated with brazing. Such glasses do not of course interfere with the visibility of the illuminated portions of the work, however, the flux container is not so illuminated and the operator must either remove or push his glasses aside (or the mask incorporating the glasses) in order to see the flux container clearly or even to see the same at all. Otherwise the operator must (if he is just not downright lucky) probe around with the tip of the brazing rod until he can locate and insert the rod into the container through the small access opening.

Not only are delays of such character a frustrating nuisance, time consuming, but also the materials being welded are being allowed to cool. Furthermore, the rod also cools somewhat during such a delay, with the consequence that a somewhat greater variation in the amount of flux that will adhere to the rod will occur than would otherwise be the case, it being noted that the amount adhering tends to be a function of the temperature of the rod.

Such delays can and do occur even when the operator can readily direct the tip of the rod toward the access opening (without the advantage of vision) with sufficient accuracy to contact the cover of the container on the first attempt, and in a large measure the practical value of the present invention is based on actual experience indicating that most operators can rather consistently direct the rod with sufficient accuracy to hit the cover on the first attempt whereas they, to say the least, have considerable difficulty in hitting the access opening immediately.

Accordingly, the primary object of the present invention is to enable an operator without the advantage of vision to quickly locate and insert a brazing rod into the small central access opening of the brazing can cover upon contacting such cover with the tip of the rod.

Another object of the invention is in accordance with the preceding object to provide a container that will have a large flux capacity in relation to the overall size thereof.

Briefly, an important aspect of the invention relates to a wall of a container having an external surface that is generally frusto-conical in configuration about an axis that passes through the interior of the container, said external surface being concave toward the exterior of the container and being of at least such an extent in area that the area of a projection of such surface upon a plane normal to said axis constitutes a substantial proportion of the area of projection of the entire container upon said plane, said wall having an access opening therethrough at a position such that said axis extends through the opening, and essentially the entire extent of said external surface about said access opening being sloped toward the opening and the interior of the container to constitute a means for slidingly and cammingly directing an end of an object urged against such surface by a force generally parallel to the axis toward and into said access opening.

Another aspect of the invention has to do with the external surface of the wall described in the preceding paragraph being provided with a plurality of guide means radially extending from positions spaced about the periphery of the access opening.

Still another aspect of the invention pertains to the wall defined in the penultimate being in the form of a circular cover releasably secured to the rest of the container by tongue and groove means wherein alternately either the tongue or the groove can be integral with the cover, and wherein optionally an auxiliary cover can be secured by tongue and groove means to the first-mentioned cover so as to effectively close the container when the access opening is not closed and to render optional the provision of a closure for solely the access opening.

These and other objectives, advantages and aspects of the invention will be most readily understood on consideration of the following description of preferred embodiments of the invention illustrated in the accompanying drawings, wherein.

Figure 8:
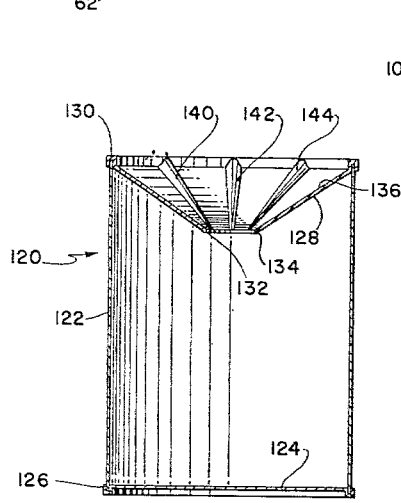
Figure 9:
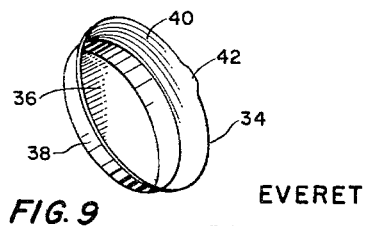

FIGURE 8 is a central vertical sectional view of a further embodiment of the invention, wherein the wall in which the access opening is provided is additionally provided with guide means extending radially from the access opening; and FIGURE 9 is an enlarged isometric view of a plug closure such as can be employed in connection with each of the illustrated embodiments of the invention for closing the access opening.

Figure 1:
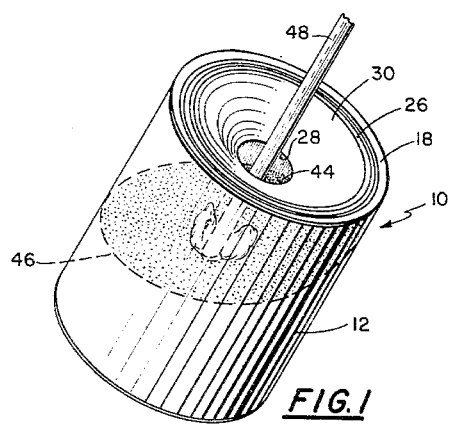
FIGURE 1 is an isometric view of a container according to the invention, the same being shown with the plug closure for the access opening removed, and the same being shown in connection with a partly illustrated brazing rod and with the level of the flux within the container and the portion of the brazing rod within the container being shown in dashed outline.
Figure 2:
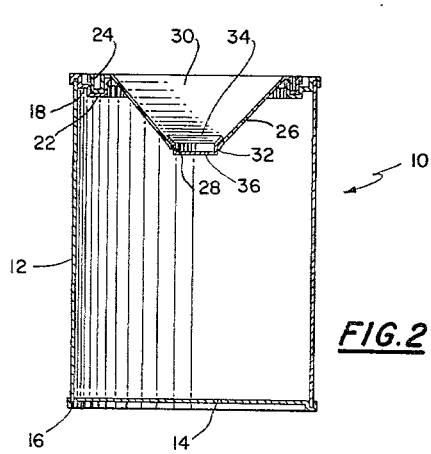
FIGURE 2 is a central vertical sectional view of the container shown in FIGURE 1, this view additionally showing the plug closure for the access opening.

Referring now to the drawings wherein like numerals designate like parts throughout the various views, and initially directing attention to the embodiment of the invention shown in FIGURES 1, 2 and 9, the reference numeral 10 designates generally a container according to the invention. The container 10 is comprised of a cylindrical side wall 12 that is metallic, and which can be (as is true of each and every part of all of the container embodiments illustrated in the drawings) of essentially the same character as is customarily employed in the manufacture of what are commonly referred to as tin cans and the like. Preferably, and as is usually the case in the art wherein an iron-based sheet metal is employed a conventional protective coating is employed on all exposed surfaces of the sheet metal, with care being exercised that the inner protective coating be compatible with the intended contents of the container formed thereof. Also, as is conventional, the side wall 12 is of seamed construction (not shown), and if desired the joint defined by the seam can be soldered.

The lower open end of the container 10 is closed by a circular bottom wall 14, the peripheral margins of the wall 14 being crimped about the lower edge of the cylindrical side wall 12 in the conventional manner as indicated at 16. If desired or deemed expedient, the joint between the bottom wall 14 and the side wall 12 can be soldered.

Means is provided of conventional character at the upper end of the container 10 for releasably and sealingly closing the upper end of the container 10. Such means comprises an annular rim 18 formed of a sheet metal similar in character to the walls 12 and 14, such rim 18 including a peripheral outer margin that is crimped in conventional manner about the upper edge of the side wall 12 as indicated at 20. As in the case of the bottom wall 14, the rim 18 is fixedly attached to the side wall 12 and can if desired or deemed expedient be soldered thereto. The major extent of the annular rim 18 projects inwardly from the upper edge of the side wall 12 and is in the conventional manner provided with a portion so shaped as to define an annular groove or channel 22 (see FIGURE 3) that opens upwardly for releasably receiving in sealing relationship a depending annular tongue 24 disposed about the periphery of and constituting an integral part of a cover or wall 26 for the upper end of the container 10.

While the bends or folds in the annular rim 18 and the tongue structure 24 of the cover 26 are illustrated as being sharp and the opposite sides of the groove 22 and the tongue 24 as being parallel, it will be understood that the sharpness of creasing or bending will in actual practice be limited by the working or forming characteristics of the sheet materials used in manufacture as well as by limitations imposed by the tools and dies used in manufacture. It will suffice for the purposes of understanding the present invention to point out that the annular rim 18 and the tongue construction 24 thus far described is entirely conventional and that the opposite sides of the groove 22 and the tongue 24 can be conventionally tapered to facilitate convenient separation of the cover 26 from the annular rim 18 as well as to facilitate the establishment of a sealing connection between such parts upon insertion of the tongue 24 in the groove or channel 22.

Except as hereinafter pointed out specifically, the structure thus far described is entirely conventional. Whereas covers or lids for containers of the type described are generally flat, as well as imperforate, the cover 26 differs in that the same is provided with a central opening 28 that is circular and of relatively small diameter as compared to the inner diameter of the annular rim 18. Rather than being essentially flat, the cover 26 is substantially frusto-conical in configuration, the major transverse dimension of such configuration being approximately equal to the internal diameter of the annular rim 18, and with the minor transverse dimension of such configuration being equal to the diameter of the opening 28. The arrangement is such that at least a substantial proportion and in the illustrated preferred embodiment of the invention a major proportion of the area of projection of the cover 26 upon a plane normal to the central axis of the container 10 is defined by the portion of the cover 26 constituting the frusto-conical configuration. The frusto-conical configuration of the cover 26 is symmetrical about the central vertical axis of the container 10, and the arrangement is such that the cover 26 projects inwardly into the space surrounded by the side wall 12 and thereby to present an external surface 30 that is concave. The external surface 30 constitutes a camming surface for a purpose presently to be described, and is of such extent that a projection thereof on a plane normal to the central vertical axis of the container 10 constitutes at least a substantial proportion of the entire area of projection on such plane of the container 10.

The peripheral marginal edge of the cover 26 is downturned to form a lip as indicated at 32 about the opening 28 for frictionally retaining a removable closure plug 34 in the opening 28. Like the structural components thus far described, the closure plug 34 is also formed of sheet metal and the same comprises (see FIGURE 9) a bottom wall 36 having an upstanding peripheral flange 38 that is outwardly flared about its upper margin as indicated at 40. Preferably, the outwardly flaring portion of the flange 40 is provided with a projecting lip 42 for use in conjunction with a prying tool such as a screw driver, not shown, in removing the closure plug or cap from the opening 28, it being noted that the lip 42 is spaced above the external surface 30 of the cover 26 when the closure cap 34 is frictionally and sealingly seated in the opening 28 in engagement with the lip 32.

The use of the container 10 will be readily understood upon reference to FIGURE 1. The container or can 10 is initially filled by the manufacturer with flux 44 through the opening 28, the cover 26 being assembled on top of the container 10 with the closure 34 removed, or optionally the manufacturer can fill the container 10 with flux when the cover 26 is removed therefrom. In any event, after the container 10 has been filled with flux by the manufacturer, the container 10 including the cover 26 and the closure 34 are assembled as shown in FIGURE 2. It is preferred that the container 10 only be filled with flux 44 by the manufacturer up to the level of the opening 28 leaving void the annular space within the container 10 defined by the side wall 12 and the cover 26 above the opening 28. When filling the container 10 to this level, it is convenient to fill the same through the opening 28 for the reason that excessive filling is not likely to occur. However, if desired, the entire interior of the container 10 can be filled, this being most conveniently accomplished by filling the container 10 with the cover 26 removed, and the container 10 being filled initially to a height somewhat below the lower level of the annular rim 18 so that sufficient volume will remain available for applying the cover 26 to the container 10 as will be appreciated. If the latter degree of filling is adopted, it is preferred that the slope of the frusto-conical configuration of the cover 26 be approximately equal to the angle of repose of the particulate or granulate flux 44, or that in any event such slope be such that on opening the opening 28 by removal of the closure 34 that flux does not tend to flow and rise upwardly through the opening 28 in an attempt to seek the level of the flux in the annular space within the container 10 surrounding the frusto-conical configuration of the cover 26.

FIGURE 1 illustrates the container 10 being only partially filled with flux, the level thereof being indicated in dashed outline at 46. The reference numeral 48 designates a brazing rod inserted into the container 10 through the opening 28 so as to be thrust into the flux 44 therein. In order that the operator may insert the flux rod 48 into the container 10 as illustrated in FIGURE 1, it is only necessary that the operator move the end of the flux rod 48 in the direction of the top of the container 10 with sufficient accuracy so as to strike any part of the external surface 30 of the cover 26, with the brazing rod 48 and the surface 30 thereafter coacting upon the operator urging the rod 48 in a direction generally paralleling the central vertical axis of the container 10 to cam the end of the rod 48 in the direction of the opening 28 so that the end of the brazing rod 48 will readily move into and through the opening 28. It is to be particularly emphasized that the operator need not directly pass the rod 48 through the opening 28 as will ordinarily only occur in an unreliable manner, but that the rod 48 can be thrust into the flux with nearly as great ease as though the entire cover 26 was removed from the container 10.

It is also to be noted especially that the entire configuration of the external surface 30 including the smooth manner in which such surface 30 merges with the internal surface of the lip 32 is such as to not present any obstacle or obstruction to the free sliding movement of the rod 48 as it is cammed toward and into the opening 28. This is in distinct contrast to structures such as shown in U.S. Patent Nos. 1,983,185 (issued to Novak, Dec. 4, 1934) and 2,002,675 (issued to W. A. Rathbun et al., June 11, 1935), though of course the patented structures were not intended for the same purpose as the containers of the instant invention.

Other constructions heretofore proposed though not intended for the same purposes as the containers of the instant invention would nevertheless not function at all or at best in an extremely inefficient manner by reason of the provision of obstacles in the path of free movement of the brazing rod or by reason of the wall surrounding the access opening being entirely or largely flat for a substantial extent in one or more directions from the access opening, as may be appreciated upon reference to U.S. Patent Nos. 799,820 (issued to Young et al., Sept. 19, 1905), 844,108 (issued to Dunbar, Feb. 12, 1907), 2,318,424 (issued to Sattler, May 4, 1943), 2,119,502 (issued to Bertels, May 31, 1938) and 2,337,869 (issued to Chapman, Dec. 28, 1943).

It will be readily appreciated by those skilled in the art that the cover 26 and the closure 34 therefore can be supplied separately by welding supply houses or the like (either for a monetary consideration or gratis in connection with an advertising program involving the printing of advertising on either the cover 26 or the closure 34) to consumers as a replacement cover for conventional container or tin cans provided with the conventional annular rim 18 at their upper extremity.

It will also be appreciated by those skilled in the art that the groove 22 and the tongue 24 can be reversed in that the latter would be an integral part of the annular rim 18 and the former an integral part of the cover 26, such alternate location of parts affording the additional advantage that the brazing rod could not become engaged in the recessed upper surface of the cover 26 opposite the tongue 24; however, such measure of desirability is considered more than offset by conforming the instant invention's embodiments to conventional and extant container construction.

Figure 4:
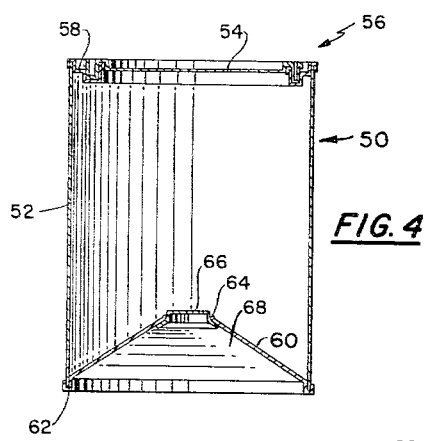
FIGURE 4 is a vertical sectional view of another embodiment of the invention, wherein the container wall provided with the access opening is fixedly secured to the rest of the container.

Attention is now directed to the embodiment of the invention shown in FIGURE 4. The reference numeral 50 designates generally this modification of the invention, the container 50 being comprised of a cylindrical side wall 52 generally similar to the previously described side wall 12. The upper open end of the container 50 is closed by a removable cover or lid 54 that is releasably and sealingly secured to the upper end of the side wall 52 by conventional tongue and groove means 56 that includes an annular rim 58.

The open bottom end of the container or can 50 is closed by a cover 60 that largely is similar to the previously described cover 26, the cover 60 differing from the cover 26 in the manner of its attachment to the rest of the container 50. The cover 60 is fixedly secured to the lower edge of the side wall 52 by having the peripheral margin of the cover 60 crimped about the lower edge of the side wall 52 as indicated at 62. If desired, the joint defined by the juncture of the side wall 52 and the cover 60 can be soldered. The cover 60, like the cover 26 includes a frusto-conical configuration disposed about a central opening 64 of reduced size that is closable by a frictionally retained and reusable closure 66 such as previously described closure 34.

The cover 60 by virtue of the frusto-conical configuration thereof presents an external surface 68 that constitutes a camming surface having the same camming function as the previously described surface 30 of the cover 26.

The use of the container 50 shown in FIGURE 4 will be readily apparent from the previously given description of the use of the container 10. One of the principal advantages of the container 50 resides in the comparative ease with which the entire contained volume of the container 50 is to be filled by flux, it being assumed that no reason exists for it being found objectionable for the annular space within the container surrounding the cover 60 being filled with flux when the container 50 is inverted. To fill the container in this manner, the manufacturer fills the container 50 through the opening normally closed by the cover 54. In the use of the container 50, the latter is of course inverted from the position shown thereof in FIGURE 4. An outstanding advantage of the structure shown in FIGURE 4 is that the concave surface 68 together with the opening 64 constitutes almost the entire area of projection of the container 50 upon a plane normal to the central vertical axis of the container 50. In other words, it is only necessary for the operator to be able to hit the container 50 within only a very tiny peripheral margin of the end of the container defined by the wall 60 in order for the brazing rod to be directed to and through the opening 64.

Figure 5:
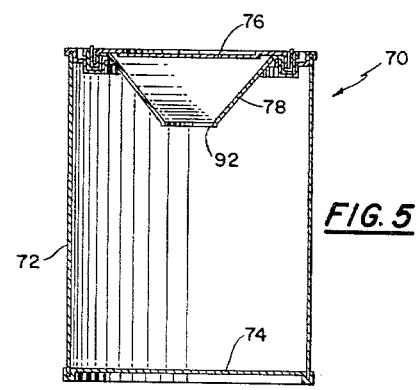
FIGURE 5 is a central vertical sectional view of yet another embodiment of the container, wherein an auxiliary cover is provided for a removable cover, the access opening being disposed in the latter.

Attention is now directed to the embodiment of the invention illustrated in FIGURE 5, this embodiment of the invention being designated generally by the reference numeral 70. The container 70 comprises a cylindrical side wall 72, with the bottom of the container 70 being closed by a bottom wall 74 secured to the side wall 72 in the same manner that the wall 14 is secured to the side wall 12 in the container 10. In general, the container 70 differs from the container 10 solely in that the closure 34 can optionally be omitted if desired, and in that an auxiliary cover 76 is provided. As will be seen in FIGURE 6, the container 70 includes a cover 78 that is provided with a peripheral depending tongue 80 that is removably and sealingly received in a channel or annular groove 82 constituting an integral part of an annular rim 84 that is fixedly secured to the upper end edge of the side wall 72 as indicated at 86.

Figures 3, 6, 7:
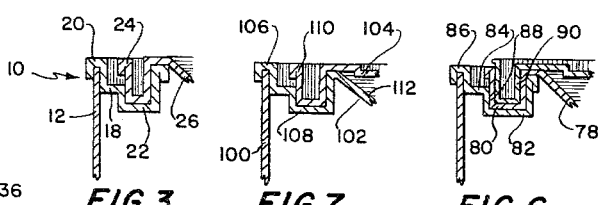
FIGURE 3 is an enlarged sectional detail view of the means by which the cover is secured to the top of the container.
FIGURE 6 is an enlarged sectional detail view of the structure included in the embodiment of the invention shown in FIGURE 5 for securing the covers to each other and to the rest of the container.
FIGURE 7 is an enlarged sectional detail view of still another embodiment of means for securing the wall in which the access opening is provided and an outer cover, such wall being fixedly secured to the container, and the outer cover being detachably secured to the wall.

The marginal annular portion of the cover 78 bent to define the annular tongue 80 is of sheet metal and additionally defines an annular groove 88 that opens upwardly and in which is releasably and sealingly received a depending annular tongue on the circular auxiliary cover 76, as clearly shown in FIGURE 6.

With the construction shown in FIGURES 5 and 6, access to the interior of the container 70 through a central opening 92 in the cover 78 can only be obtained upon separating the cover 76 from the cover 78, as may be conveniently accomplished by the use of a prying tool such as a screw driver, not shown. If desired, as in the filling of the container 70, the covers 76 and 78 can be jointly removed from the rest of the container 70 without separating the covers 76 and 78, as will be evident to those conversant with the art.

The use of the container 70 will be manifest in the light of the use of the previously described embodiments of the invention. One of the principal advantages of the construction shown in FIGURE 7 resides in the fact that the essentially flat upper surface of the cover 76 makes a stable stacking of containers more stable. In other words the lower edge of a container cannot readily slide into the concave region bounded by the frusto-conical cover of the container next therebelow. Also, the use of a closure for the opening 92 can be dispensed with if desired.

Inasmuch as the container 70 can be filled through the opening 92, so as to render separation of the cover 78 from the rest of the container unnecessary, it is possible in a simplified embodiment of the invention to fixedly secure the cover 78 to the upper edge of the side wall 72, with the outer peripheral margin of the cover 78 being provided with an annular groove for receiving the depending annular tongue of the cover 76. Such a simplified embodiment of the invention is illustrated in sectional detail in FIGURE 7, wherein the side wall is designated at 100, and the reference numerals 102 and 104 designate respectively the main cover and the auxiliary cover. The outer peripheral edge of the main cover 102 is fixedly secured to the side wall 100 at 106, and adjacent such peripheral edge, the main cover 102 is formed to define an annular groove or channel 108. The outer peripheral edge portion of the auxiliary cover 104 is bent to define a depending annular tongue 110 that is releasably and sealingly received within the groove 108. As will be understood, the central region of the circular main cover 102 corresponds generally to the central portion of the previously described cover 78 and is definitive of a frusto-conical external surface 112 for cammingly guiding a brazing rod into and through a central opening, not shown, in the main cover 102. It will be understood that the structure in FIGURE 7 constitutes in effect a modification of the structure shown in FIGURE 6, and that the structure shown in FIGURE 7 except to the extent hereinbefore pointed out is identical to the structure shown in FIGURES 5 and 6. As mentioned previously, the essence of such structural change resides in the cover 102 being integral with the annular rim construction secured to the side wall at 106.

Attention is now directed to yet another embodiment of the invention shown in FIGURE 8, this distinct embodiment of the invention being designated generally at 120. The container or can 120 comprises a circular cylindrical side wall 122 of sheet metal such as used in all the other illustrated and described embodiments of the invention. As in the case of the containers 10 and 70, the lower end of the container 120 is closed by a bottom wall 124 of sheet metal that is fixedly and sealingly secured to the lower edge of the side wall 122 as indicated at 126. The upper end of the container 120 is closed by a cover 128 that is similar in many respects to the wall 60 of the container 50 previously described. The cover 128 is circular and the outer peripheral margin thereof is crimped about the upper edge of the side wall 122 as indicated at 130 so as to be fixedly and sealingly secured to the side wall 122. If desired, the joint 130 between the wall 128 and the side wall 122 can be soldered.

The cover or wall 128 is provided with a relatively small central access opening 132, the peripheral edges of the cover 128 about the opening 122 being slightly downturned to define a lip 134 for frictionally engaging a closure plug such as the closure 34 shown in FIG. 9. As in the case of the previously described embodiments of the invention wherein a closure such as that shown in FIGURE 9 is used, the closure sealingly closes the access opening 132 when inserted therein, and can be removed and thereafter reused as desired.

As is clearly apparent on inspection of FIGURE 8, the closure 128 is of frusto-conical configuration about the central vertical axis of the container 120, with the major transverse dimension of such configuration being approximately equal to the diameter of the cylindrical side wall 122, and the minor transverse dimension of such configuration being equal to that of the diameter of the access opening 132. As thus far described, the closure wall 128 is substantially identical to the wall 68 of the container 50 both as to its shape and the means by which the same is attached to the side wall of the container.

Attention will now be directed to the distinguishing features of the wall 128.

Inasmuch as it is possible upon the operator pressing the end of a brazing rod against the upper camming surface of the wall 128 designated at 136 for the tip of the rod's engagement to travel in a path tending to travel around the access opening 132 to a position approximately diametrically opposed to the position of initial engagement, especially when the rod is urged against the camming surface 136 with a force that is considerably out of parallelism with the central axis of the container 120; means is provided for preventing or at least greatly reducing any such tendency so that the sliding engagement of the rod and the surface 136 will tend to predominately travel radially in toward the access opening 132 and so that such engagement will be confined within a predetermined angular sector from the center of the access opening 132. Such guide means comprises a plurality of upstanding ridges 140, 142 and 144 on the upper camming surface 136 of the cover 128, such ridges or corrugations of the sheet metal from which the cover 128 is formed extending radially from positions spaced circumferentially about the opening 132 to positions circumferentially spaced about and adjacent to the juncture of the cover 128 and the side wall 122. It will be noted that each of the ridges or corrugations 140, 142 and 144 extend straight and along such a line that is contained in a plane that also contains the central axis of the container 120.

The advantage of the provision of the guide means will be readily appreciated upon considering what would occur in the absence of such provision if the tip of a brazing rod pressed against the surface 136 in the region between the ridges 142 and 144 and urged in a direction somewhat downwardly and also to the left. Quite obviously, the tip of the rod in its engagement with the surface 136 might travel along a travel path that would travel across the sector between the ridges 140 and 142 and even into the sector to the left of the ridge 140 so as to miss the opening 132 and to be then in engagement with a portion of the surface 136 not so favorably inclined for camming the rod toward the opening 132. With the provision of the illustrated and described guide means, such movement is prevented upon the tip of the brazing rod engaging the ridge 142 which would then cooperate with the surface 136 in directing the tip of the rod straight toward the center of the access opening 132. Preferably the guide means takes the form illustrated in FIGURE 8, wherein the height of the ridges 140, 142 and 144 tends to vary from a maximum value adjacent the periphery of the cover or wall 128 to a minimum value adjacent the periphery of the access opening 132. This construction is preferred for the reason that it is most desirable to emphasize a guiding function at positions spaced greater distances from the access opening 132 and for the further reasons that such formation of the ridges or corrugations is most compatible with the crimping of the cover 128 about the side wall 122 and also with the portion of the cover 128 about the periphery of the opening 132 being most compatible with effective closure of the opening 132 in the use of a closure such as the closure shown in FIGURE 9. Though not preferred for the reasons indicated, it will be obvious that the corrugations could be precisely inverse to the illustrated form in that valleys would be defined rather than ridges 140, 142 and 144, it being deemed evident that those skilled in the art would appreciate that such valleys would also perform a guiding function quite analogous to that accomplished in the use of the ridges 140, 142 and 144. Indeed, the entire upper surface 136 of the cover or wall 128 can be undulating so as to define alternating valleys and ridges radiating from positions spaced about the periphery of the opening 132 to the peripheral margin of the cover 128. It will also be manifest to those skilled in the art that whenever deemed necessary or expedient, the previously described walls or covers 26, 60, 78 and 102 can also be provided with guide means in the nature of those illustrated in FIGURE 8.

While it is preferred that the various embodiments of the invention be of sheet metal construction, it will be apparent that other materials such as thermoplastic or thermosetting plastics or resins can be employed so long as they are compatible with or inert to the materials or substances to be contained therein, and so long as they are sufficiently resistant to any deleterious effect that may be brought about contact therewith by a hot brazing rod. Indeed, a container according to this invention can be of composite character such as for example the closure wall 128 can be metal or a thermosetting resin such as Bakelite with the walls 122 and 124 being a thermoplastic material such as polyethylene or the like, suitable means for connecting the cover 128 to the side wall 122 being provided (such as a threaded connection therebetween, not shown, or a suitable adhesive).

Inasmuch as the scope of the present invention is such that numerous departures and variations can be made from the illustrated and described preferred embodiments of the invention without departing from the spirit thereof, attention is directed to the appended claims in order to ascertain the actual scope of the invention.

I claim:
1. In a container including a circular wall, said wall having a central axis normal thereto, the improvement comprising said wall having an external surface of generally frusto-conical configuration about said axis with such external surface being concave and of such an extent in area that the area of projection of such surface upon a plane normal to the axis constitutes a major proportion of the area of projection of the entire circular wall, said circular wall having a central access opening, the arrangement being such that the external surface constitutes a means for slidingly and cammingly directing an end of an object urged against such surface by a force generally parallel to said axis toward and into said access opening, said container including a second circular wall opposite the first-mentioned wall, an intermediate cylindrical wall connecting the circular walls, tongue and groove means releasably and sealingly securing the second circular wall to the intermediate wall, and a closure cap removably received in the access opening.

2. The combination of claim 1, wherein the external surface is provided with corrugations extending radially from the access opening.

3. In a container including a wall, the improvement comprising said wall having an external surface that is generally frusto-conical in configuration about an axis that passes through the interior of the container, said external surface being concave toward the exterior of the container and being of at least such an extent in area that the area of a projection of such surface upon a plane normal to said axis constitutes a major proportion of the area of projection of the entire container upon said plane, said wall having an access opening therethrough at a position such that said axis extends through the opening, said external surface being provided with a plurality of guides extending radially from positions spaced about the periphery of the access opening, and essentially the entire extent of said external surface about said access opening being sloped toward the opening and the interior of the container to constitute a means for slidingly and cammingly directing an end of an object urged against such surface by a force generally parallel to the axis toward and into said access opening, with said guides tending to confine the position of engagement of the external surface with an object to an angular segment of the external surface defined by adjacent guides.

4. A can for flux comprising a cylindrical upstanding wall having upper and lower ends, a circular bottom wall closing the lower end of the cylindrical wall, a frusto-conical wall provided with a central opening therethrough and having a major end and a minor end, said frusto-conical wall having its major end uppermost and its minor end lowermost with the minor end being received within the cylindrical wall in spaced relation above the bottom wall, said frusto-conical wall having an upper surface that continuously slopes downwardly to the central opening whereby such surface will continuously direct an object pressed thereagainst toward the central opening, a first tongue and groove means releasably securing a peripheral margin of the major end of the frusto-conical wall to the upper end of the cylindrical wall, said tongue and groove means including said peripheral margin of the frusto-conical wall having an annular portion having an annular groove defined on one side thereof and an annular tongue defined on the other side thereof with such annular portion of the frusto-conical wall having a thickness intermediate the tongue and the groove that they are in nested relation to each other, a circular closure wall at the upper end of the cylindrical wall, and a second tongue and groove means which include said annular portion for releasably securing the closure wall to the major end of the frusto-conical wall.

References Cited by the Examiner

UNITED STATES PATENTS

| | | | |
|---|---|---|---|
| 799,820 | 9/1905 | Young et al. | 220—27 |
| 1,196,385 | 8/1916 | Mutch | 220—29 X |
| 1,983,185 | 12/1934 | Novak | 220—66 |
| 2,120,357 | 6/1938 | Gray | 220—23 |
| 2,211,326 | 8/1940 | Gillice | 220—23 |
| 2,641,382 | 6/1953 | Mason | 220—86 |

THERON E. CONDON, *Primary Examiner.*

GEORGE E. LOWRANCE, *Examiner.*

R. A. JENSEN, *Assistant Examiner.*